United States Patent
Willi

(10) Patent No.: US 9,162,565 B2
(45) Date of Patent: Oct. 20, 2015

(54) LIQUID NATURAL GAS STORAGE TANK MOUNTING SYSTEM

(75) Inventor: Martin Leo Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 13/600,424

(22) Filed: Aug. 31, 2012

(65) Prior Publication Data

US 2014/0060946 A1 Mar. 6, 2014

(51) Int. Cl.
*B60K 15/067* (2006.01)
*B60K 15/07* (2006.01)
*B60K 15/063* (2006.01)

(52) U.S. Cl.
CPC ............... *B60K 15/07* (2013.01); *B60K 15/063* (2013.01); *B60Y 2200/142* (2013.01); *Y10T 29/49826* (2015.01)

(58) Field of Classification Search
CPC ..... B60K 15/063; B60K 15/067; B60K 15/07
USPC ........... 180/69.4; 220/562; 280/830, 832, 834
See application file for complete search history.

(56) References Cited

U.S. PATENT DOCUMENTS

| | | | | |
|---|---|---|---|---|
| 3,905,508 A * | 9/1975 | Hibl et al. | | 220/476 |
| 4,223,899 A * | 9/1980 | Krieger | | 280/834 |
| 4,934,732 A | 6/1990 | Fukunaga et al. | | |
| 5,123,671 A * | 6/1992 | Driessen et al. | | 280/5.519 |
| 5,228,585 A * | 7/1993 | Lutgen et al. | | 220/4.14 |
| 5,634,665 A * | 6/1997 | Jung | | 280/834 |
| 5,658,013 A * | 8/1997 | Bees et al. | | 280/831 |
| 5,787,940 A | 8/1998 | Bonn et al. | | |
| 5,794,979 A * | 8/1998 | Kasuga et al. | | 280/834 |
| 6,042,071 A * | 3/2000 | Watanabe et al. | | 248/313 |
| 6,142,191 A | 11/2000 | Sutton et al. | | |
| 6,676,163 B2 * | 1/2004 | Joitescu et al. | | 280/834 |
| 7,044,113 B2 * | 5/2006 | Bingham et al. | | 123/523 |
| 7,198,301 B2 * | 4/2007 | Wozniak et al. | | 280/830 |
| 7,624,753 B2 * | 12/2009 | Suess et al. | | 137/266 |
| 7,976,067 B2 * | 7/2011 | Naganuma et al. | | 280/834 |
| 7,984,653 B2 * | 7/2011 | Oelerich et al. | | 73/756 |
| 8,579,331 B2 * | 11/2013 | Hayashi et al. | | 280/834 |
| 8,672,359 B2 * | 3/2014 | Ohashi | | 280/834 |
| 2006/0197332 A1 | 9/2006 | Hashimura | | |
| 2008/0100017 A1 | 5/2008 | Bitter | | |
| 2010/0051625 A1 * | 3/2010 | Dandalides et al. | | 220/562 |
| 2013/0068905 A1 * | 3/2013 | Green | | 248/220.21 |
| 2013/0284748 A1 * | 10/2013 | Sloan et al. | | 220/562 |
| 2013/0306695 A1 * | 11/2013 | Guaresimo et al. | | 224/567 |

FOREIGN PATENT DOCUMENTS

CN 201633536 11/2010
JP 1056217 3/1989

* cited by examiner

*Primary Examiner* — Katy M Ebner
(74) *Attorney, Agent, or Firm* — Miller, Matthias & Hull LLP

(57) ABSTRACT

A fuel tank mounting system for movable machine is disclosed. The mounting system may include a fuel tank connected to a frame of the movable machine in such a manner as to allow vertical motion of the tank relative to the frame. The fuel tank may be mounted to the frame using a spring and/or a shock absorber. The fuel tank may be a cryogenic fuel tank for storage of liquid natural gas. The shock absorbers may be tunable so that the level of dampening provided by the shock absorber is tailored to the type of machine and the specific mode of operation of the machine.

17 Claims, 4 Drawing Sheets

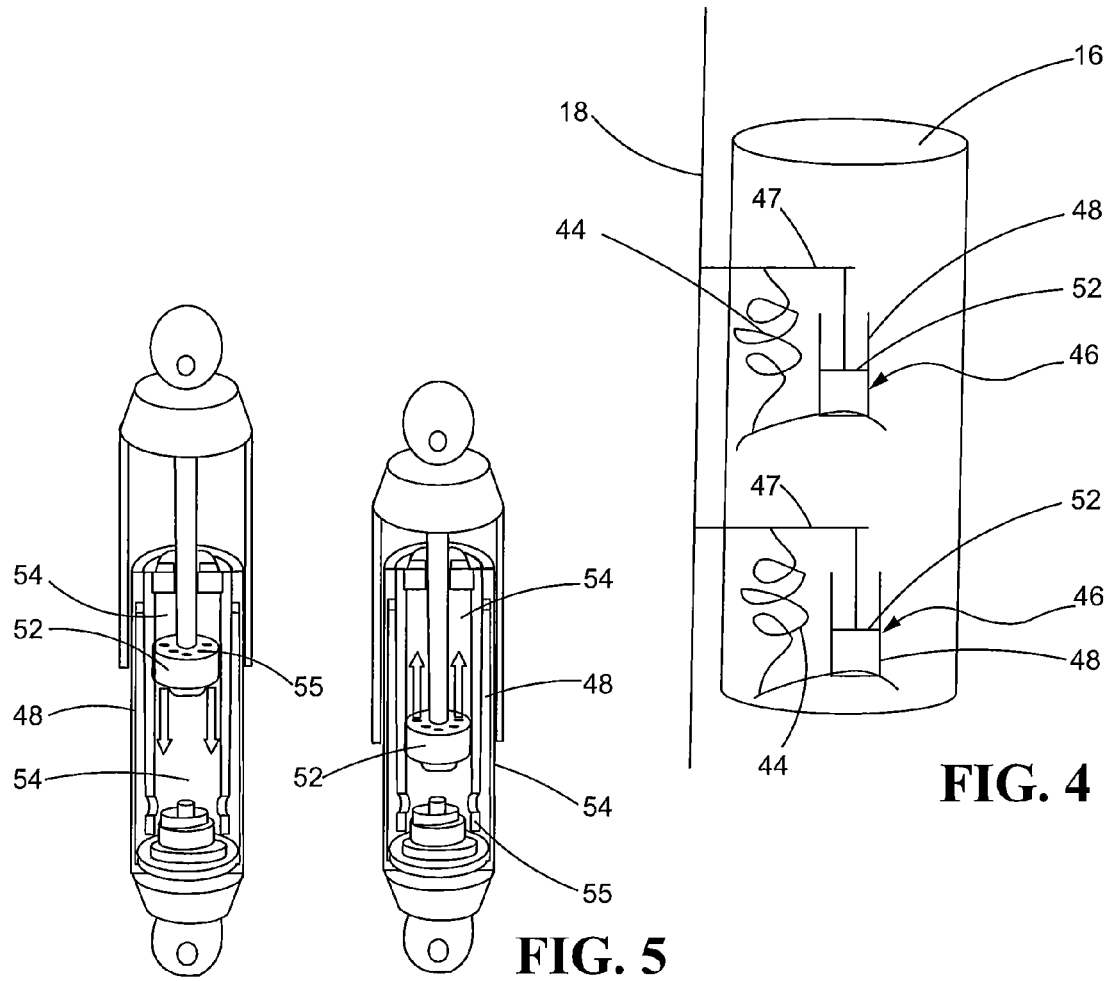
FIG. 4
FIG. 5
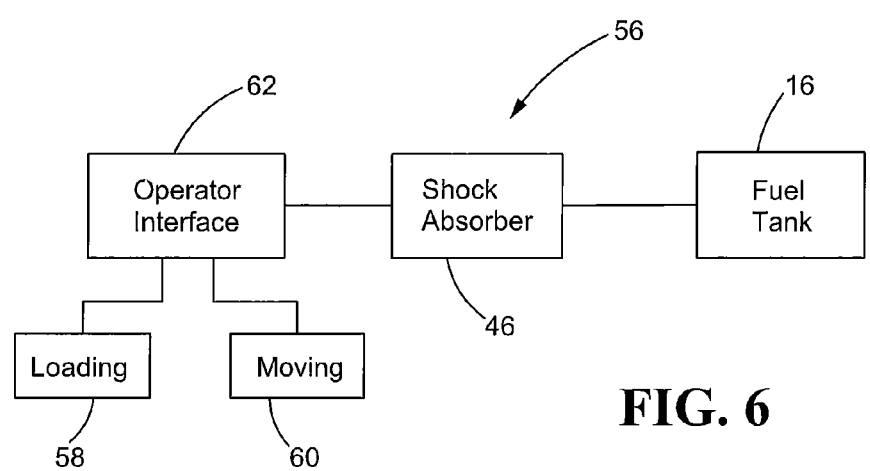
FIG. 6

LIQUID NATURAL GAS STORAGE TANK MOUNTING SYSTEM

FIELD OF THE DISCLOSURE

The present disclosure generally relates to fuel tanks and, more particularly, relates to fuel tanks mounted on moving machines.

BACKGROUND OF THE DISCLOSURE

The use of liquid natural gas (LNG) for powering movable machines is becoming increasingly popular. Among other things, LNG engines have a reduced carbon output and thus are viewed as more environmentally friendly than conventional diesel and other internal combustion engines powered by gasoline. In addition, given the prevalence of LNG (primarily methane), the cost associated with such fuel is lower than other fuel products and thus consumer demand for such machines is increasing. LNG machines can not only be used to power movable machines such as automobiles for over the highway use, but also to power many work machines used in industrial, construction, and agricultural settings such as, but not limited to, dump trucks, loaders, excavators, and the like.

While effective, LNG powered machines are currently not provided without difficulties. For example, for storage of the liquid natural gas onboard a machine, a specialized fuel tank needs to be provided. Such tanks include an inner chamber or tank which is cryogenically cooled to a temperature at which the natural gas is maintained in liquid form. For example, such tanks often need to be cooled to $-160°$ C. or less. In order to protect that inner tank from damage, and to assist with insulating the inner tank from heat loss, an outer tank is often provided around the inner tank with a vacuum insulation layer being provided therebetween.

With conventional movable machines, the ING tanks are fixably mounted to the outside frame of the machine. For example, rigid mechanical brackets may extend from the frame and be attached to the fuel tank. In so doing, the outer tank is exposed to vibration transmitted to the tank during the normal course of operation of the machine. As a result of the transmitted vibration and shock loads and inner structure damage that may result from such loading, the inner tank may not be able to be maintained at the low temperature desired, or if it is able to maintain such a temperature, can do so only at a lesser efficiency than prior to the damage. As liquefied natural gas takes up about $\frac{1}{600}^{th}$ the volume of gaseous natural gas, if the lower temperature cannot be maintained, the tank will be subjected to elevated internal pressures and will vent to atmosphere.

Such damage is particularly likely with movable machines subjected to very large vertical loads. For example, with a large mining truck (LMT) used in large scale mining operations, the payload of such LMTs may be upwards of 400 tons. In order to efficiently load such trucks, loaders are often provided with a lifting capacity of 130 tons or more so as to ensure loading of the truck within three passes. By dumping 130 ton loads into such trucks, the trucks are subjected to extreme vertical loads and in so doing so are the liquid natural gas storage tanks rigidly attached thereto. With conventional LNG storage tank mounting systems, no dedicated structure of system is specifically provided to enable the tank to handle such vertical loads and thus the 130 ton load exerted against the trucks accelerates the truck rapidly enough to induce large loads against the ING storage tank. Accordingly, it can be seen that a need exists for a liquid natural gas storage tank mounting system for movable machines which is better able to isolate the tank from such large vertical loads.

SUMMARY OF THE DISCLOSURE

In accordance with one aspect of the disclosure, a fuel tank mounting system for a movable machine is disclosed which may comprise a tank, a spring connecting the tank to a frame of the movable machine, and a shock absorber connecting the tank to the frame.

In accordance with another aspect of the disclosure, a movable machine is disclosed which may comprise a chassis, an engine mounted on the chassis, a plurality of wheels supporting the chassis, a fuel tank supported by the chassis, a spring interconnecting the fuel tank and the chassis, and a shock absorber interconnecting the fuel tank and the chassis.

In accordance with yet another aspect of the disclosure, a method for mounting a fuel tank to a movable machine which may comprise providing a frame of the movable machine, connecting the tank to the frame using a spring, and connecting the tank to the frame using a shock absorber.

These and other aspects and features of the disclosure will become more readily apparent upon reading the following description when taken in conjunction with the accompanying drawings.

BRIEF DESCRIPTION OF THE DRAWINGS

FIG. 4 is a side schematic view of the mounting system of FIG. 3;

FIG. 5 is a sectional view of a shock absorber of the present disclosure;

FIG. 6 is a schematic diagram of a manual control system constructed in accordance with the teachings of the disclosure.

While the following detailed description will be given with respect to certain illustrative embodiments, it is to be understood that the scope of the disclosure should not be so limited. In addition, it should be understood that the drawings are not necessarily to scale and that the disclosed embodiments are sometimes illustrated diagrammatically and at partial views. In certain instances, details which are not necessary for an understanding of the disclosed methods and apparatus or which render other details difficult to perceive may be omitted.

DETAILED DESCRIPTION OF THE DISCLOSURE

Figure 1:
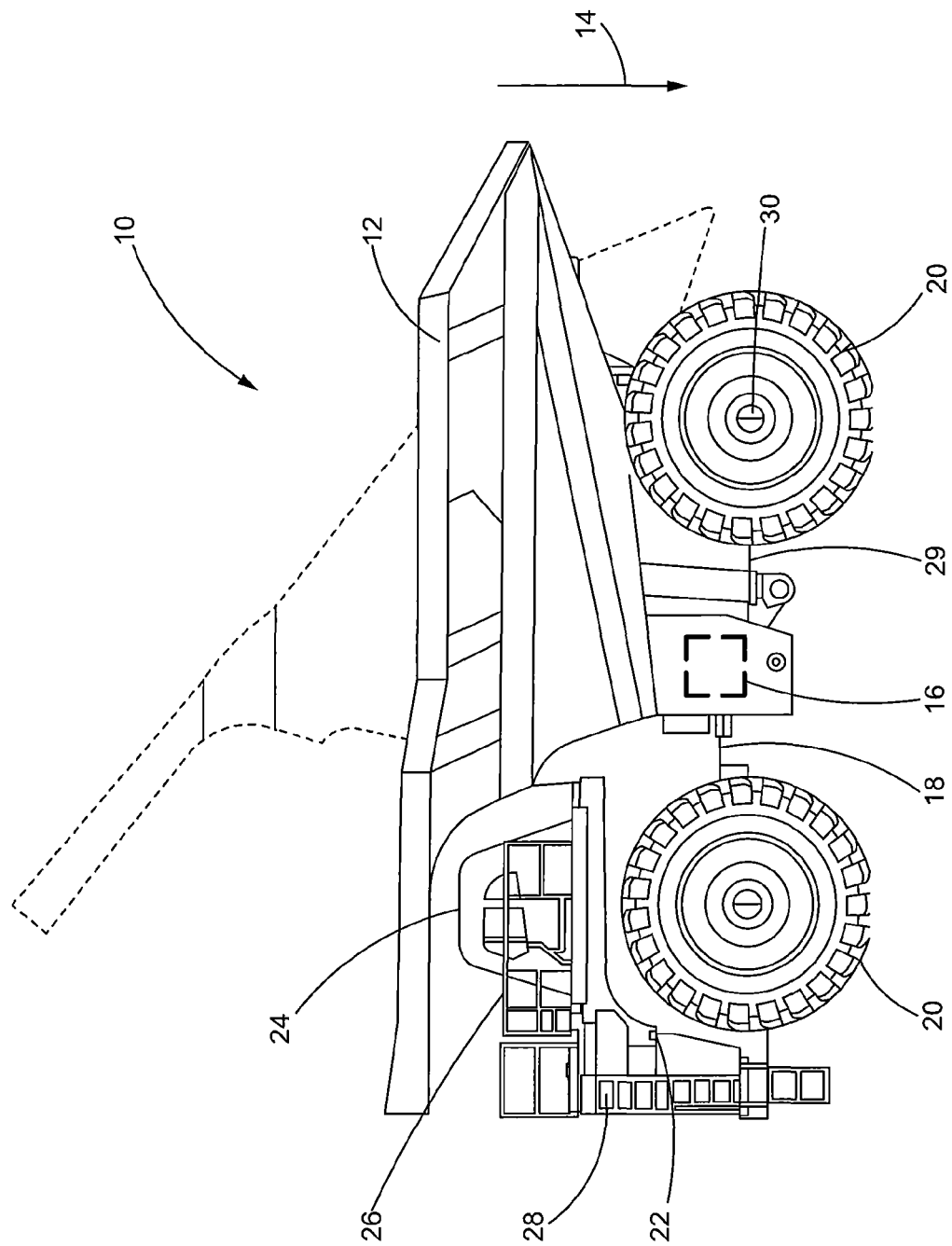
FIG. 1 is a perspective view of a movable machine constructed in accordance with the teachings of the disclosure.

Referring now to the drawings, with specific reference to FIG. 1, a movable machine constructed in accordance with the teachings of this disclosure is generally referred to by reference numeral 10. As shown therein, machine 10 may be provided in the form of a dump truck in this case a large mining truck (LMT), but the teachings of this disclosure can find applicability in connection with any number of different movable machines including, but not limited to, smaller trucks, articulated trucks, loaders, excavators, pipe layers, motor graders, and the like. However, the machine 10 depicted in FIG. 1 is an LMT as the teachings of this disclosure can find particular applicability in connection with machines 10 which are subjected to significant vertical loads. An LMT is one such machine in that it is subjected to significant vertical loads due to the fact that the overall payload of such a machine may be on the order of or excess of 400 tons. Moreover, as such machines are loaded with efficiency at a mining operation, it is not uncommon for such a machine 10 to be loaded within three passes of a bucket loader, each bucket carrying 130 tons or more. When that load is released into the machine truck bed 12, the entire machine 10 is subjected to a significant vertical load in the direction of arrow 14. This causes everything associated with machine 10 to be similarly subjected to a significant vertical acceleration and thus everything associated with machine 10 must be able to withstand the loads required to provide for such an acceleration. This includes a fuel tank 16 schematically represented in FIG. 1.

For purposes of completeness, it should also be noted that machine 10 may include a chassis or frame 18 supported by wheels 20 (or tracks or other form of locomotion) and powered by an engine 22. In addition, an operator cabin 24 is also supported by the chassis 18 and reachable by an operator by way of a catwalk 26, as well as a ladder 28. The dump body 12 may also be supported by the chassis 18 and be movable by way of one or more hydraulic cylinders 29.

The engine 22 may be partially or entirely powered by liquefied natural gas (LNG). LNG is typically provided in the form of methane, but other natural gases are certainly possible. As indicated above, such natural gases are viewed as environmentally more friendly and are currently provided at a lower cost than other fuel sources such as, but not limited to diesel fuel and gasoline. Such an engine 22 can be used to not only provide locomotion to the wheels 20 by way of a transmission 30, but also to power the hydraulic cylinders 29 used to raise and lower the truck bed 12 as well as perform other operations onboard the machine 10.

Figure 2:
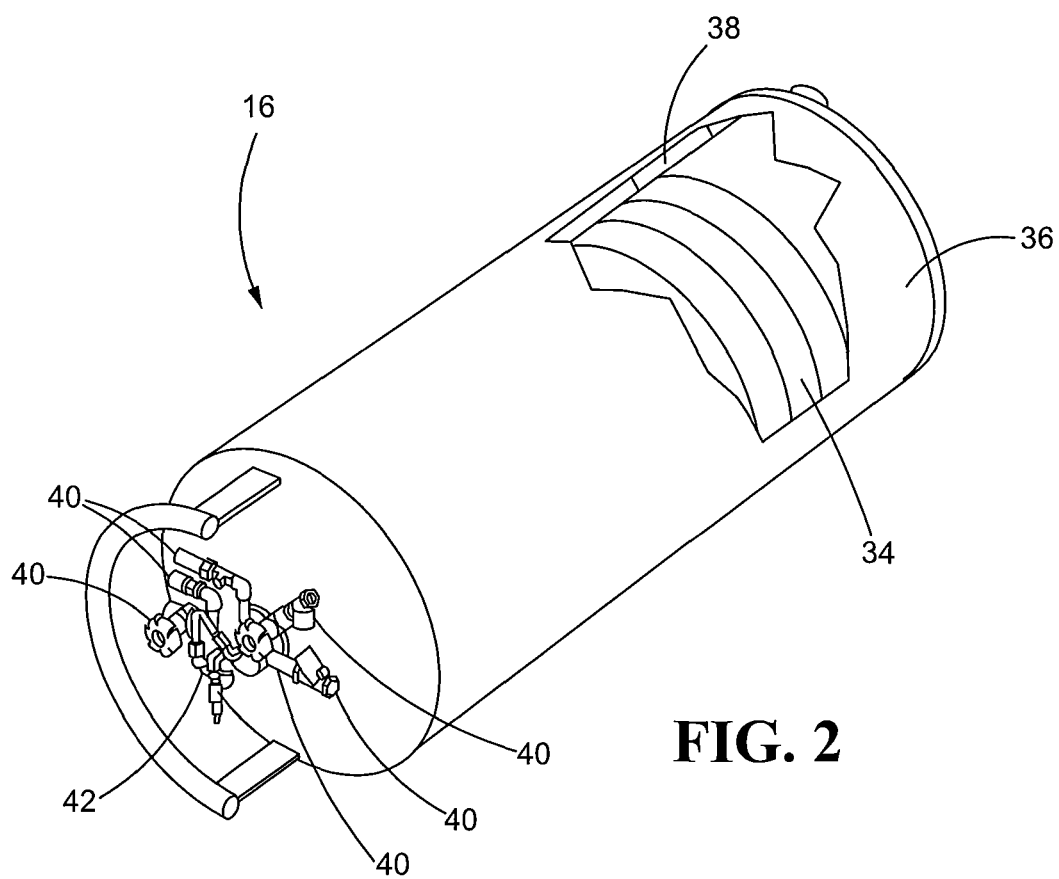
FIG. 2 is a sectional view of a cryogenic liquid natural gas (LNG) tank constructed in accordance with the teachings of the disclosure.

While effective, the provision of an LNG engine 22 by necessity requires a provision of an LNG fuel tank 16. Referring now to FIG. 2, such an LNG fuel tank 16 is shown in an exemplary fashion. As shown therein, the fuel tank 16 may include an inner tank 34 surrounded by an outer tank 36 with an isolative material or vacuum jacket 38 therebetween. A plurality of valves 40 such as relief valves, shutoff valves, check valves, and flow valves as well one or more regulators 42 may also be provided to provide flow of LNG from the fuel tank 16 to the engine 22. Such a construction of the fuel tank 16 is significant because in order to maintain liquid natural gas in its liquefied state, it needs to be maintained at a temperature of −160° C. or lower. Accordingly, not only is the construction of the inner tank 34 important, but so too is the maintenance of the insulation layer 38 between the inner tank 34 and the outer tank 36. Any damage to the outer tank 36 or the structure between the inner and outer tanks due to the loadings from acceleration described can necessarily affect the insulation layer 38 and thus the ability of the inner tank 34 to maintain the cryogenically cooled state of the liquid natural gas.

Figure 3:
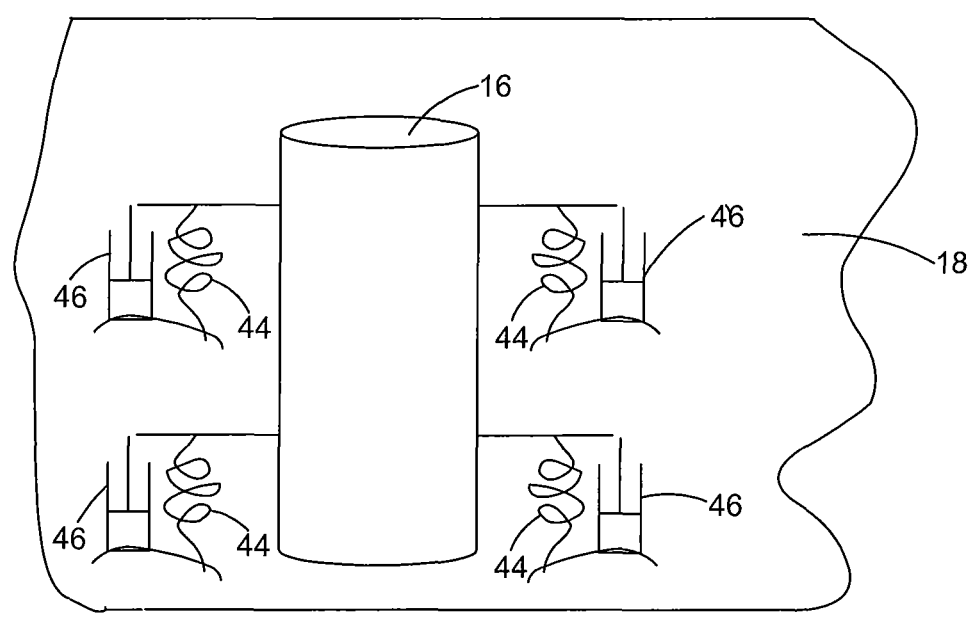
FIG. 3 is a front schematic view of a fuel tank mounting system constructed in accordance with the teachings of the disclosure.

Accordingly, and in accordance of the teachings of the present disclosure, the fuel tank 16 is mounted in a manner to enable the tank 16 to avoid significant damage as the machine 10 is subjected to significant vertical loads in the direction of arrow 14. More specifically, referring now to FIGS. 3 and 4, it can be seen that the fuel tank 16 is mounted to the machine chassis 18, or another rigid component of the machine 10, in a manner allowing the tank 16 to vertically move and thus better absorb the impact of an incoming vertical load. For example, the fuel tank 16 can be mounted to the frame by way of one or more springs 44 and shock absorbers 46. However, springs 44 and/or shock absorber 46 need not be employed, but rather any movable mounting apparatus wherein the fuel tank is not rigidly attached to the frame 18 may be employed. One or more brackets 47 may be used to interconnect the tank 16, the springs 44, and the shock absorbers 46.

Each spring 44 may include a plurality of coils made of spring steel or the like enabling the spring 44 to elongate and compress. Accordingly when an incoming vertical load impacts the truck bed 12, the fuel tank 16 is not exposed to that entire load, but rather the spring 44 expands and contracts to allow for the load to be lessened over time. In other words, the fuel tank 16 is provided with enhanced vibration isolation during "rock drop" or other loading operations. Of course, while a coil spring is depicted, any number of other types of springs, including but not limited to gas springs, leaf springs, cantilever springs, torsion springs and flat springs, may also be used.

In addition to the spring 44, one or more shock absorbers 46 may be provided. The shock absorber 46 controls expansion and contraction of the spring 44 and shortens the length of time for the fuel tank to regain equilibrium. As shown in FIG. 5, the shock absorber 46 may include a cylinder 48 in which a piston 52 reciprocates. The cylinder 48 may contain a volume of hydraulic or pneumatic fluid 54, with the piston 52 including a plurality of small apertures or perforations 55 enabling the hydraulic fluid 54 to slowly pass through the piston 52. However, as the perforations 55 are relatively small, only a small amount of hydraulic fluid can pass therethrough, under great pressure. In so doing, the shock absorber 46 is able to dampen or slow down movement of the piston 52, which in turn slows down movement of the spring 44, which in turn slows down movement of the fuel tank 16. The likelihood of the fuel tank 16 experiencing damage by way of incoming vertical loads is therefore substantially lessened.

Referring now to FIG. 6, an alternative embodiment of the present disclosure is described. In the embodiment of FIG. 6, a tunable mounting system 56 is disclosed. By "tunable," it is meant that the mounting system is able to provide varying levels of dampening depending on the mode of operation of the machine 10, or even the type of machine 10. For example, in the depicted embodiment, it will be noted that the operator is able to choose (or in another embodiment described later herein, the machine control system is able to automatically choose) between at least one of two settings, namely, a loading setting 58 and a moving setting 60. In the loading setting, the machine 10 is likely stationary, and expecting an incoming vertical load from a loader or bucket. In a moving setting, the load has already been imparted into the truck bed 12 and the machine 10 is traversing a terrain to move the load from one location to another.

From the foregoing, it can be seen that in a loading situation, the machine 10 is going to experience a significant incoming vertical load and the mounting system 56 can be tuned to better absorb that incoming load and thus lessen the likelihood of any damage to the fuel tank 16. However, in a moving setting, the incoming vertical loads are unlikely, but the machine will be likely moving faster and thus the mounting system is adjusted accordingly. More specifically, by increasing the resistance to movement of the piston 52 through the cylinder 50, the shock absorber 46 is able to more quickly adjust to fast moving conditions and shocks such as when the machine 10 is moving. However, when large vertical loads are incoming, resistance is lowered to allow the piston 52 to more freely move through the cylinder 50 and thus absorb the large loads but over a long period of time.

Referring again back to FIG. 6, the tunable mounting system 56 is shown in schematic fashion to include an operator interface 62 with a loading setting button or actuator 58, and a moving setting actuator or button 60. Such an operator interface 62 may be provided in the operator cabin 24 or elsewhere on the machine 10. The tunable mounting system 56 would receive an incoming signal from actuator 58 or 60 and then, using a processor 64, generate a suitable signal to the shock absorber 46 so as to adjust its resistant to movement. By adjusting the resistance to movement of shock absorber 46, the ability of the fuel tank 16 to vertically move in response to an incoming vertical load being dumped into the truck bed 12 is greatly increased.

Figure 7:
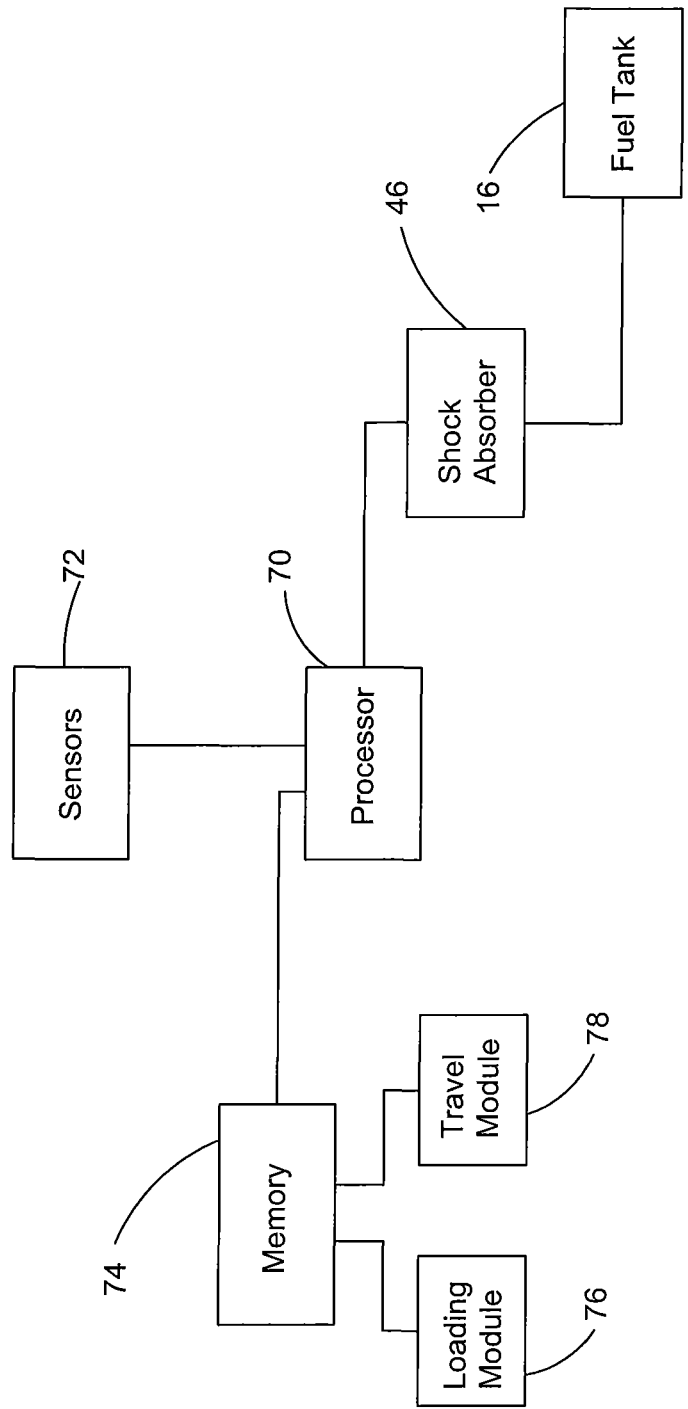
FIG. 7 is a schematic diagram of an automatic control system constructed in accordance with the teachings of the disclosure.

In another embodiment depicted in FIG. 7, the user does not select the mode of operation, but rather such a mode would be automatically selected by the machine 10. As shown therein, the machine 10 may include an on-board computer processor 70 adapted to receive signals from one or more sensors 72. Such sensors determine parameters indicative of whether the machine 10 is moving. For example, the sensor 72 may be a speedometer, a gear sensor, a parking brake sensor, an accelerometer, or the like. Depending on the data tracked by the sensor 72, the processor 70 will compare that data to thresholds or other comparators stored in memory 74. If the processor 70 determines the machine 10 is moving, the commands stored in software travel module 76 are employed, and conversely, if the processor 70 determines the machine 10 is stationary, the commands stored in software loading module 78 are employed. Similar to the above manual embodiment, whether the machine 10 is moving or loading determines the signals sent by the processor 70 to the shock absorber 46 to thus set its resistance to movement. In turn, this adjusts the ability of the fuel tank 16 to vertically move in response to an incoming vertical load.

INDUSTRIAL APPLICABILITY

In general, it can therefore be seen that the teachings of the present disclosure can find industrial applicability in any number of different situations wherein a fuel tank needs to be mounted in a fashion enabling the machine to which it is mounted to more readily accept large vertical loads. For example, with a dump truck or large mining truck, incoming loads into the truck bed of the truck may be in excess of one hundred tons. Such a large vertical load could significantly damage a fuel tank mounted to the truck if the tank is mounted in a rigid fashion such as by way of brackets or the like. However, by using the mounting system of the present disclosure, the fuel tank is able to move in a vertical direction along with the incoming load and thus better absorb that force, thereby reducing the transmitted loads. Moreover, by providing a shock absorbing system in the mounting system, the tank is not only able to vertically move with the load but quickly be restored to a stationary position relative to the machine. In the event the machine is adapted to work in a moveable fashion, the mounting system can be tunable so as to provide different levels of shock absorption depending on the mode of operation of the machine.

Not only does the foregoing mounting system prolong the usable life of the tank, but by isolating vibrations of same during rock drop, a less expansive and smaller sized LNG tank is usable in lieu of larger, more expensive tanks mounted in a fixed capacity. For example, through the use of the foregoing disclosure, a standard on-highway LNG tank that can withstand 6 g loading may be usable in place of a more expensive tank capable of 11 g loading as is heretofore used in LMT applications.

What is claimed is:

1. A fuel tank mounting system for a movable machine, comprising:
   a tank; and
   a movable mounting apparatus connecting the tank to a frame of the movable machine, the movable mounting apparatus enabling vertical motion of the tank relative to the frame, the movable mounting apparatus including a spring and shock absorber, the shock absorber including tunable hydraulic dampening, the shock absorber including a stationary mode of operation being active when the movable machine is being loaded and a moving mode of operation being active when the movable machine is in motion, the shock absorber exhibiting a first amount of dampening in the stationary mode of operation and a second amount of dampening in the moving mode of operation, the second amount of dampening being greater than the first amount of dampening.

2. The fuel tank mounting system of claim 1, wherein the movable mounting apparatus includes a processor.

3. The fuel tank mounting system of claim 2, wherein the tank is a liquid natural gas tank which includes an inner cryogenic tank and an outer tank.

4. The fuel tank mounting system of claim 2, wherein the movable mounting apparatus includes a sensor in communication with the processor.

5. The fuel tank mounting system of claim 1, wherein the shock absorber includes a cylinder and a piston slidably disposed in the cylinder.

6. A movable machine, comprising:
   a chassis;
   an engine mounted on the chassis;
   a plurality of wheels supporting the chassis;
   a fuel tank supported by the chassis;
   a spring interconnecting the fuel tank and the chassis; and
   a shock absorber interconnecting the fuel tank and the chassis, the shock absorber including tunable hydraulic dampening, the shock absorber including stationary mode of operation being active when the movable machine is being loaded and a moving mode of operation being active when the movable machine is in motion, the shock absorber exhibiting a first amount of dampening in the stationary mode of operation and a second amount of dampening in the moving mode of operation, the second amount of dampening being greater than the first amount of dampening.

7. The movable machine of claim 6, wherein the fuel tank stores liquid natural gas.

8. The movable machine of claim 6, wherein the fuel tank includes an inner cryogenic tank, an outer tank and insulation therebetween.

9. The movable machine of claim 6, wherein the movable machine is a truck.

10. The movable machine of claim 9, wherein the movable machine is a dump truck.

11. The movable machine of claim 6, wherein the shock absorber includes a cylinder and piston slidably disposed in the cylinder.

12. The movable machine of claim 6, further including a processor and a sensor in communication with the shock absorber.

13. A method of mounting a fuel tank to a movable machine, comprising:
   providing a frame of the movable machine;
   connecting the tank to the frame in a manner as to allow vertical movement of the tank relative to the frame using a spring and a shock absorber, the shock absorber including a stationary mode of operation being active when the movable machine is being loaded and a moving mode of operation being active when the movable machine is in motion, the shock absorber exhibiting a first amount of dampening in the stationary mode of operation and a second amount of dampening in the moving mode of operation, the second amount of dampening being greater than the first amount of dampening, and
   tuning the shock absorber to adjust an amount of dampening exhibited by the shock absorber by switching between the stationary mode of operation and the moving mode of operation.

14. The method of claim 13, wherein the tuning is performed by a processor.

15. The method of claim 14, further including providing the tank in the form of a liquid natural gas tank with a cryogenic inner tank inside an outer tank.

16. The method of claim 14, further including using a sensor to generate a signal, and having the processor tune dampening based on the signal.

17. The method of claim 13, further including allowing the tank to move relative to the frame using the spring where the frame experiences a vertical load, and dampening the movement using the shock absorber.

* * * * *